United States Patent
Lupesko et al.

(10) Patent No.: US 11,423,283 B1
(45) Date of Patent: Aug. 23, 2022

(54) MODEL ADAPTATION

(71) Applicant: Amazon Technologies, Inc., Seattle, WA (US)

(72) Inventors: Hagay Lupesko, San Mateo, CA (US); Dominic Rajeev Divakaruni, Seattle, WA (US); Jonathan Esterhazy, Alameda, CA (US); Sandeep Krishnamurthy, Santa Clara, CA (US); Vikram Madan, San Francisco, CA (US); Roshani Nagmote, San Mateo, CA (US); Naveen Mysore Nagendra Swamy, Campbell, CA (US); Yao Wang, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 851 days.

(21) Appl. No.: 15/933,114

(22) Filed: Mar. 22, 2018

(51) Int. Cl.
*G06N 3/04* (2006.01)
*G06N 3/08* (2006.01)
*G06N 3/10* (2006.01)

(52) U.S. Cl.
CPC ............... *G06N 3/04* (2013.01); *G06N 3/08* (2013.01); *G06N 3/10* (2013.01)

(58) Field of Classification Search
CPC ............... G06N 3/04; G06N 3/08; G06N 3/10
USPC .......................................................... 706/16
See application file for complete search history.

(56) References Cited

U.S. PATENT DOCUMENTS

| 2018/0005134 A1* | 1/2018 | Kish | G06N 3/084 |
|---|---|---|---|
| 2018/0032915 A1* | 2/2018 | Nagaraju | G06K 9/6262 |
| 2019/0042955 A1* | 2/2019 | Cahill | G06N 5/04 |
| 2019/0213475 A1* | 7/2019 | Erlandson | G06N 3/08 |
| 2020/0167691 A1* | 5/2020 | Golovin | G06N 7/005 |

* cited by examiner

*Primary Examiner* — Dave Misir
(74) *Attorney, Agent, or Firm* — Nicholson De Vos Webster & Elliott LLP

(57) ABSTRACT

Techniques for model adaptation are described. For example, a method of receiving a call to provide either a model variant or a model variant profile of a deep learning model, the call including desired performance of the deep learning model, a deep learning model identifier, and current edge device characteristics; comparing the received current edge device characteristics to available model variants and profiles based on the desired performance of the deep learning model to generate or select a model variant or profile, the available model variants and profiles determined by the model identifier; and sending the generated or selected model variant or profile to the edge device to use in inference is detailed.

18 Claims, 15 Drawing Sheets

MODEL 1
PROFILE 501

| LAYER | NODE ID | INPUT ID | WEIGHT | OPERATOR | DATA TYPE | ENERGY | EXEC. TIME (LATENCY) | MEMORY USAGE | ACCURACY |
|---|---|---|---|---|---|---|---|---|---|
| ... | ... | ... | ... | ... | ... | 2 W | .15 ms | 2 GB | 98% |
| 1 | ... | ... | ... | SUM | FP64 | .6 W | .08 ms | 560 MB | |
| 1 | 1 | 1 | 5.6012151 | | | ... | ... | ... | |
| 1 | 1 | 2 | 4.8154205 | | | | | | |
| 2 | ... | ... | ... | SUM | FP32 | .5 W | .06 ms | 280 MB | |
| 2 | 1 | 1 | 10.1987456 | | | ... | ... | ... | |
| 2 | 1 | 2 | 7.0000001 | | | ... | ... | ... | |
| N | ... | ... | ... | | | | | | |

*FIG. 5*

| LAYER | NODE ID | INPUT ID | WEIGHT | OPERATOR | DATA TYPE | ENERGY | EXEC. TIME (LATENCY) | MEMORY USAGE | ACCURACY |
|---|---|---|---|---|---|---|---|---|---|
| ⋮ | ⋮ | ⋮ | ⋮ | ⋮ | ⋮ | ⋮ | ⋮ | ⋮ | 95% |
| 1 | ⋮ | ⋮ | ⋮ | ⋮ | ⋮ | ⋮ | ⋮ | ⋮ | |
| 1 | 1 | 1 | 5.6 | SUM | FP32 | 1.5 w | .14 ms | 2 GB | |
| 1 | 1 | 2 | 4.8 | ⋮ | | .55 w | .008 ms | 100 MB | |
| ⋮ | ⋮ | ⋮ | ⋮ | ⋮ | ⋮ | ⋮ | ⋮ | ⋮ | |
| ⋮ | ⋮ | ⋮ | ⋮ | ⋮ | ⋮ | ⋮ | ⋮ | ⋮ | |
| ⋮ | ⋮ | ⋮ | ⋮ | ⋮ | ⋮ | ⋮ | ⋮ | ⋮ | |
| N | ⋮ | ⋮ | ⋮ | | | | | | |

MODEL 1 PROFILE 601

*FIG. 6*

MODEL ADAPTATION

BACKGROUND

Using an artificial intelligence model for inference is a common way to take in data and generate a prediction for that data. There are many types of models that may be used including deep learning models. Typically, the innerworkings of a model are set when the model is being used for inference.

BRIEF DESCRIPTION OF DRAWINGS

Various embodiments in accordance with the present disclosure will be described with reference to the drawings, in which:

FIG. 5 illustrates an embodiment of model profile.

FIG. 6 illustrates an embodiment of model variant profile.

DETAILED DESCRIPTION

Various embodiments of methods, apparatus, systems, and non-transitory computer-readable storage media for automated adaptation of a machine learning (ML) model for inference execution at an edge device and/or at a web services provider are described. In particular, the ML model is optimized for the hardware and/or conditions available at a given point of time. In some embodiments, this optimization is in the form of changes to an execution graph (e.g., removing layers, changing aspects of layers, etc.)

ML models deployed for execution are typically fast and cost-effective and are to be processed at desired throughput (such as images/second) with an acceptable latency. As detailed above, ML models may be deployed at web services providers or in local devices (such as a device at an edge of a network connection ("edge device")). With edge devices growing more computationally powerful, some ML models can be deployed on an edge device that would otherwise been better off being executed in a more powerful system provided by a web service provider. However, edge devices are usually limited in resource capability compared to a web service provider and hence models that are deployed to the edge are often constrained. Detailed herein are embodiments of systems, methods, and apparatuses for the adapting models and their execution.

Figure 1:
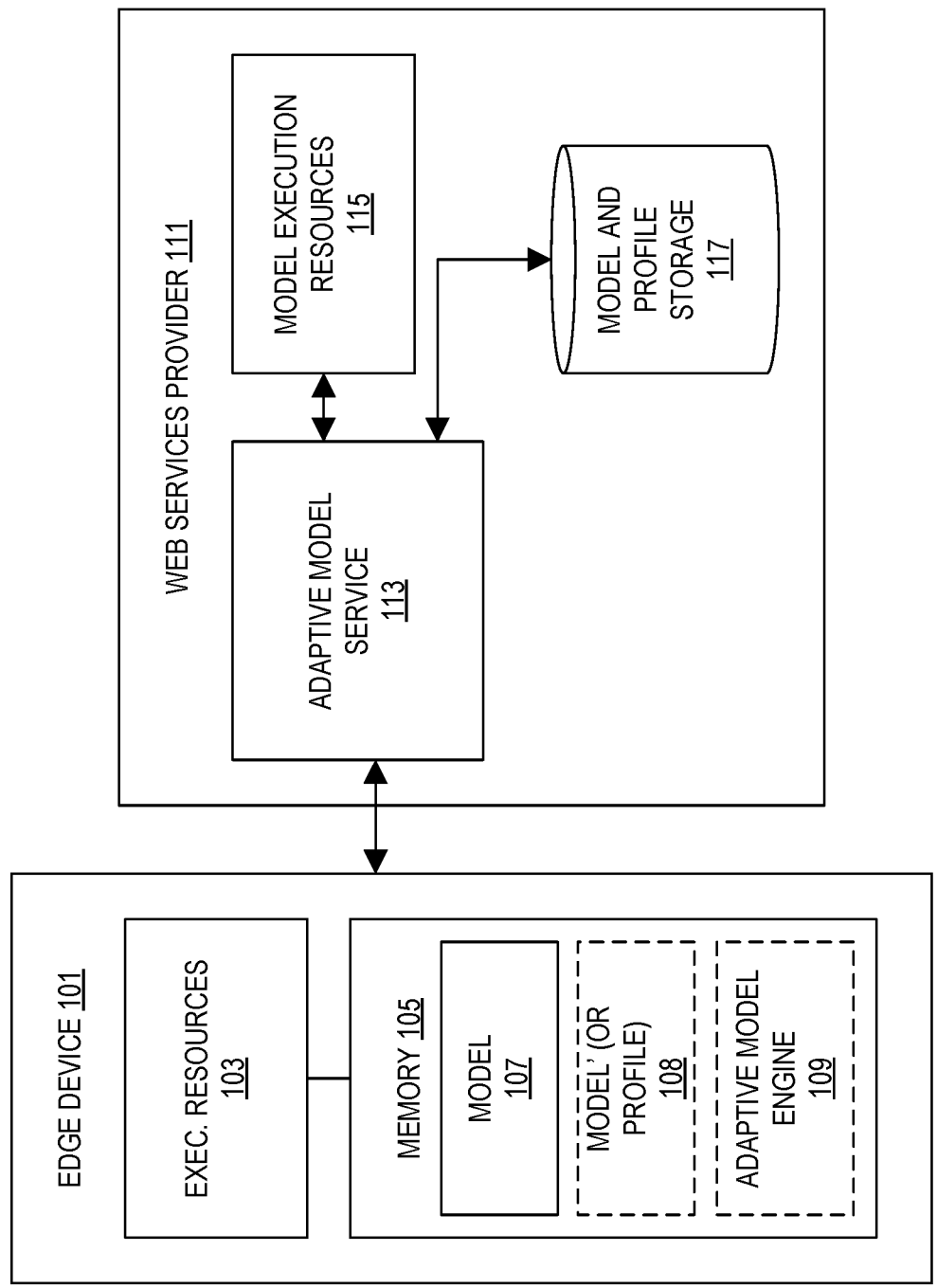
FIG. 1 illustrates embodiments of a components to perform model adaptation.

FIG. 1 illustrates embodiments of a components to perform model adaptation. In this illustration, a model may be run in an edge device 101, at a web services provider 111 (such as a cloud provider), or a combination of the edge device 101 and web services provider 111.

In this illustration, a web services provider 111 provides at least computing resources and database storage in a virtualized environment. The web services provider 111 may have many different physical machines with varying combinations of processors, memory, storage, and networking capacity and/or capability. For example, the web services provider 111 includes compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc. As such, a ML model may be executed on a physical machine of the web services provider 111.

As detailed, a ML model 107 (or a variant model 108) may also be executed on an edge device 101 using execution resources 103. Exemplary edge devices include, but are not limited to: cameras, mobile devices, audio equipment, etc. However, these devices 101 are typically less powerful than the host(s) provided by the web services provider 111 and running the same model with identical parameters may not be practical.

In some embodiments, an adaptive model engine 109 executes on the edge device to analyze a ML model and adjusts how a model should be executed. For example, the adaptive model engine 109 uses one or more of the following to decide how to adapt a ML model should run, or constituent parts thereof: 1) edge device characteristics including, for example, FLOPS, GPU RAM, CPU RAM, CPU speed, power, network capabilities (wired, wireless, and their types), memory, etc.; 2) model weights; 3) model data type usage; 4) model layers; 5) model operators; 6) web services provider characteristics; 7) available models; 8) available model profiles; and/or 9) desired objectives of ML execution (such as throughput, power usage, and accuracy).

In some embodiments, the edge device 101 stores a variant of the model 107 (model variant 108, or model' 108) or a profile to be used to change the model 107. For example, model variant 108 may quantize the model 107 (for example, use different weights and/or different data types), or remove one or more layers (or nodes of layers), or change one or more operators of the layers of the model 107. In some embodiments, these changes are stored in a profile which is consulted during execution to alter the model 107 on the fly. In some embodiments, the model 107 and model variant 108 (model') are a part of one or more containers to be executed by the execution resources 103.

In some embodiments, an adaptive model service 113 executes on the web services provider 111 to analyze a ML model and provides adjustments for how a model should be executed. For example, the adaptive model service 113 uses one or more of the following to decide how to adapt a ML model should run, or constituent parts thereof: 1) edge device characteristics including, for example, FLOPS, GPU RAM, CPU RAM, CPU speed, power, network capabilities (wired, wireless, and their types), memory, etc.; 2) model weights; 3) model data type usage; 4) model layers; 5) model operators; 6) web services provider characteristics; and/or 7) desired objectives of ML execution (such as throughput, power usage, and accuracy).

The initial model, and models and/or profiles generated by the adaptive model service 113, are stored in model and profile storage 117. In some embodiments, the initial and generated models are a part of one or more containers to be executed by the execution resources.

Execution resources of the web services provider 111 may be utilized to run a model when it is better to run remotely from the edge device 101 (for example, when the edge device 101 is under a temporary heavy load).

Figure 2:
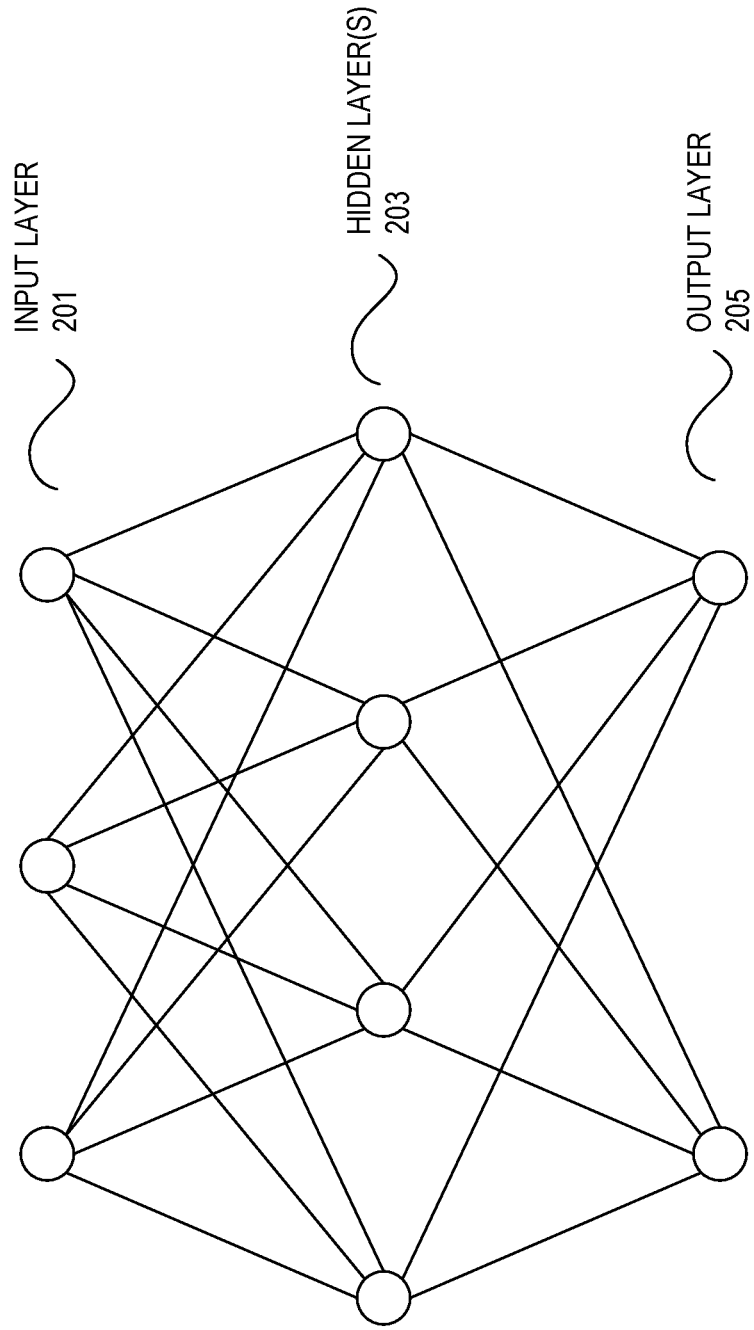
FIG. 2 illustrates an example of a deep learning model in the form of an artificial neural network.

FIG. 2 illustrates an example of a deep learning model in the form of an artificial neural network. Typically, each layer of the model is connected to all nodes of the previous layer and, as such, each layer's output is the subsequent layer's input, starting from an initial input layer that receives data for which inference is to be performed. In some instances, a bias may not be connected to all (or any) nodes of the previous layer. Neural networks that have a plurality of hidden layers are "deep-learning" networks. These hidden layers provide the depth of a deep-learning network.

Each of the layer is made of one or more nodes. A node is where computation happens (e.g., for the hidden layers 203 and output layer 205). A node combines input from the data with a set of coefficients, or weights, that either amplify or dampen that input, thereby assigning significance to inputs for the task the algorithm is trying to learn. These input-weight products are subjected to an operation (such as summed). In some embodiments, each result of the operation passes through an activation function to determine whether, and to what extent, that result progresses further through the model to affect the ultimate outcome.

Nodes of an input layer 201 takes in data from an outside source and passes this data to the hidden nodes of hidden layers 203. The hidden layer nodes have no direct connection with the outside and perform computations and transfer information from the input nodes to the output nodes. Generally speaking, adjustable weights are given to input features throughout the hidden layers which gives significance to those features with regard to how the model classifies and/or clusters input.

The output layer 205 receives the output of the hidden layers 203 and transfers that output (sometimes with computations) to the outside.

Figure 3:
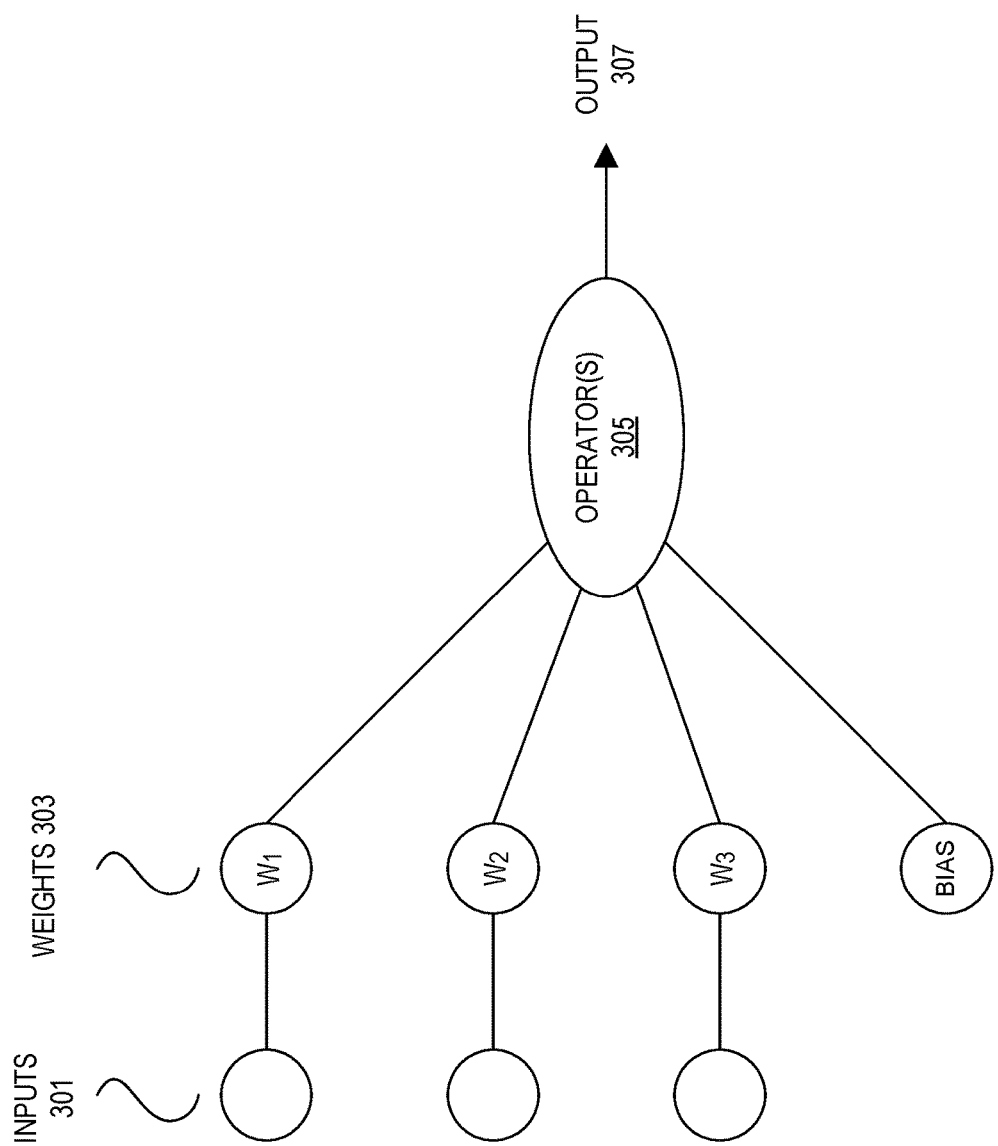
FIG. 3 illustrates an example of a node of a deep learning model.

FIG. 3 illustrates an example of a node of a deep learning model. As shown, inputs 301 receive data from a previous layer (e.g., an input layer or a hidden layer). Weights 303 are applied to each input. As shown, the weights 303 do not need to be the same. A bias may also be used.

Operator(s) 305 perform some function on the weighted data. An exemplary function is summation; however, other functions may be performed including, but not limited to, multiplication, division, subtraction, activation, etc.

The output 307 of the operator(s) 305 is then provided to the next layer (if the node is not in the output layer).

Figure 4:
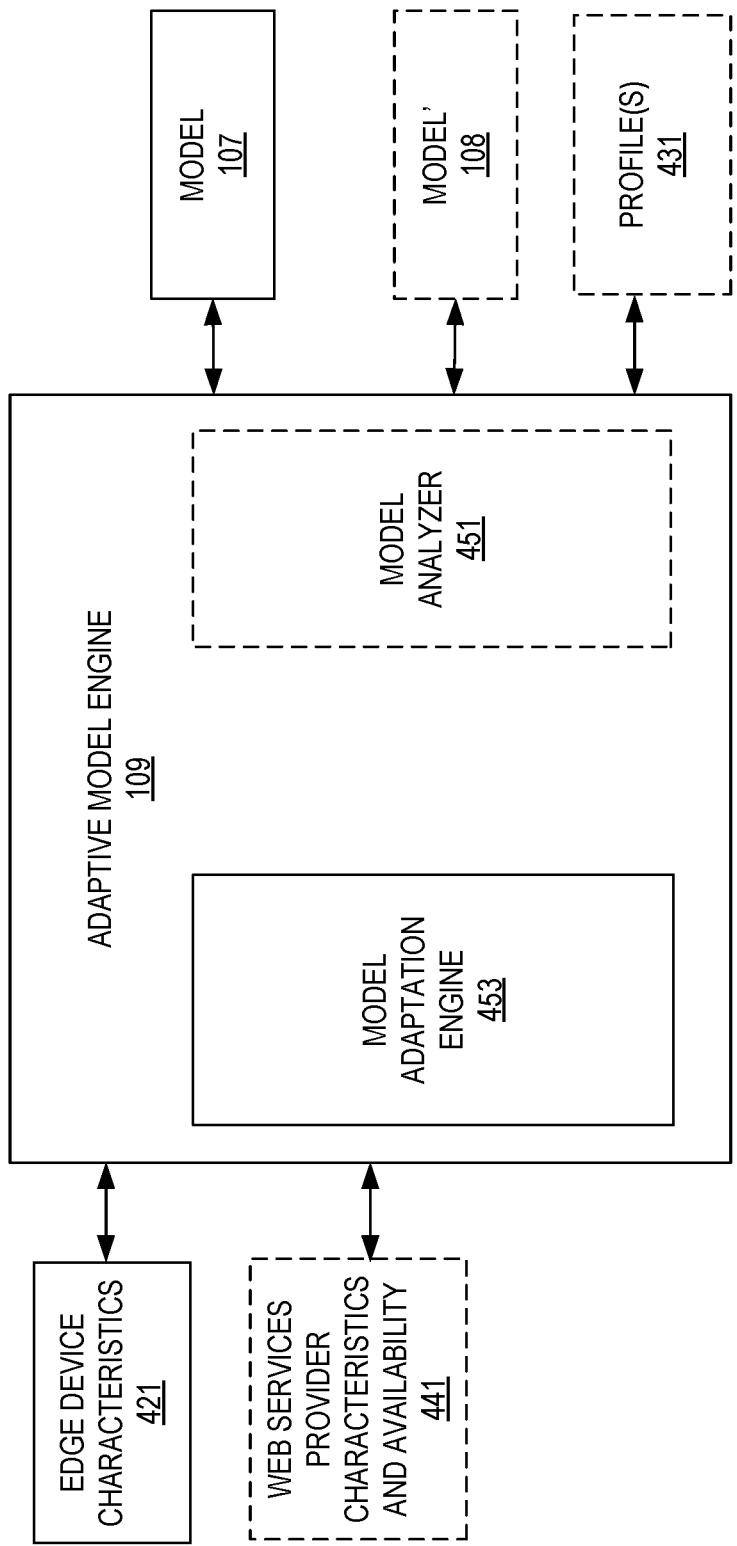
FIG. 4 illustrates embodiments of an adaptive model engine.

FIG. 4 illustrates embodiments of an adaptive model engine 109. As noted above, this engine executes on an edge device. This engine may perform one of several functions including selecting a model variant 108, updating a model 107 using one or more profile(s) 431, or enabling a model (or portion thereof) on a web services provider.

As shown, in some embodiments, the adaptive model engine 109 includes a model analyzer 451 that analyzes a model 107 to determine its constituent parts (layers, weights, memory usage, etc.) and performance (accuracy, energy usage, etc.). In some embodiments, a user verifies accuracy. Energy usage may be continually monitored, or selectively monitored depending upon on the adaptive model engine 109 is configured. The result of the analysis of the model 107 is one or more profiles 431. Examples of profiles will be detailed later. Note, in some embodiments, one or more of the model 107, one or more model variants 108, and profile(s) 431 are provided by another entity (such as a user or an adaptive model service 113). The profile(s) 431 highlight 1) model operators; 2) model weights; 3) model data type usage; and 4) model layers.

A model adaptation engine 453 receives edge device characteristics 421 including, for example, FLOPS, GPU RAM, CPU RAM, CPU speed, power, network capabilities (wired, wireless, and their types), memory, etc.; available models; and available model profile(s). In some embodiments, web services provider characteristics 441 and/or desired objectives of ML execution (such as throughput, power usage, and accuracy) are also received. The model adaptation engine 453 takes the received information to determine how to modify model execution (if needed). For example, if the model 107 can no longer run adequately (too many resources are used, for example), the model adaptation engine 453 may apply a profile, use a model variant, or use web services provider characteristics 441 to send all, or part, of model based inference to a web services provider.

FIG. 5 illustrates an embodiment of model profile. As such, the profile 501 includes fields for a layer identifier, a node identifier (per layer), an input identifier (per node), a weight used by the node for an input, what operator(s) are applied by a layer, the data type used in the layer (such as which floating point (FP) type (e.g., 256, 128 64, 32, or 16-bit), integer, and Boolean), energy usage (overall and by layer), execution time/latency (overall and by layer), memory usage (overall and by layer), and accuracy. In some embodiments, the network is unrolled.

FIG. 6 illustrates an embodiment of model variant profile. As such, the profile of the model variant 601 includes fields as FIG. 5, however, quantization has been applied (some weights have been rounded and at least one data type has been changed) and layer 2 has been removed. As such, the power, execution time, and memory usage is less, but the accuracy suffers. In some embodiments, the model adaptation engine 453 would look at these values and decide if the tradeoff with respect to accuracy is acceptable.

Figure 7:
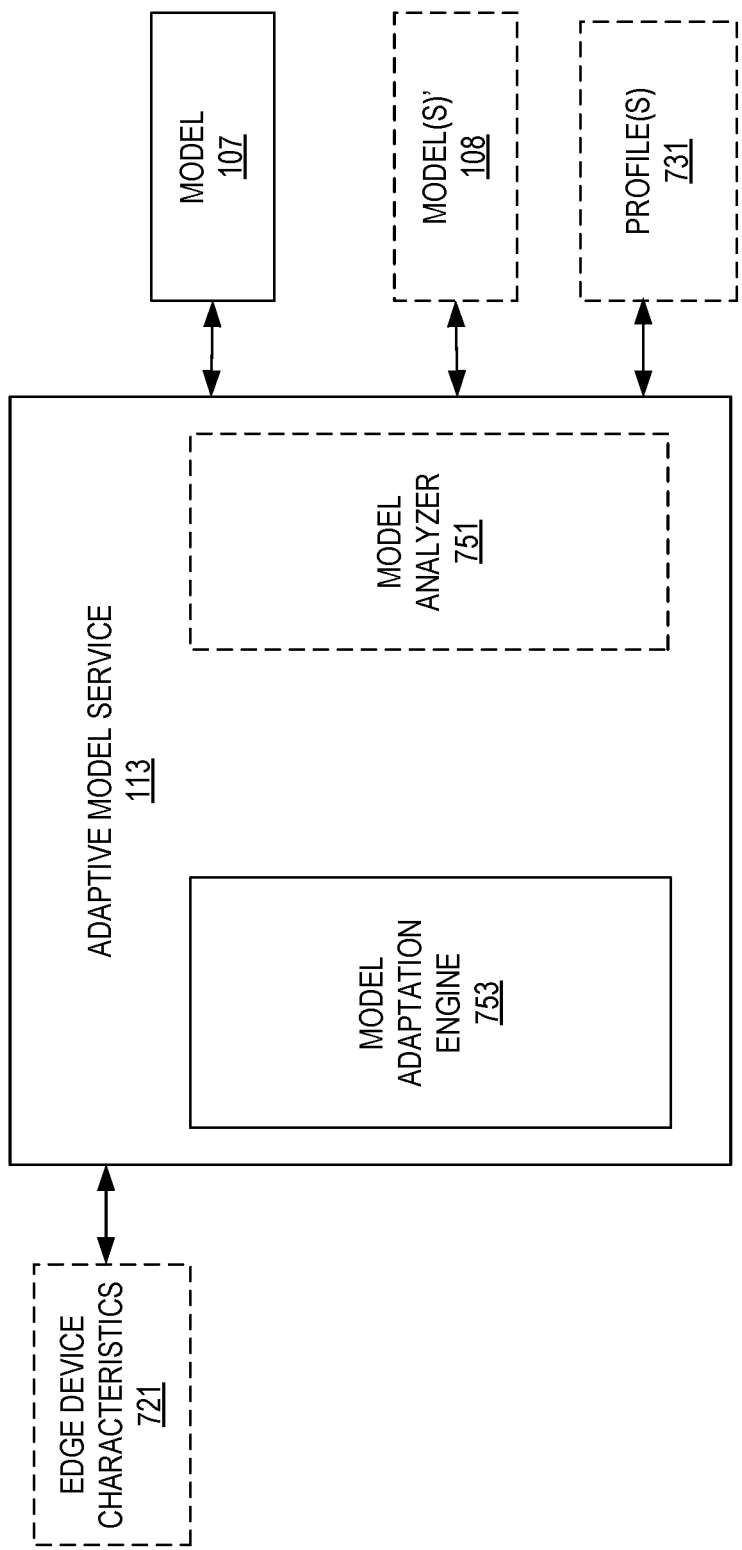
FIG. 7 illustrates embodiments of an adaptive model service.

FIG. 7 illustrates embodiments of an adaptive model service 113. As noted above, this engine executes on a web services provider. This engine may perform one of several functions including selecting or generation of a model variant 108, updating a model 107 using one or more profile(s) 731 (when the model 107 is to be executed at the web services provider), or enabling a model (or portion thereof) on an edge device. In some embodiments, this service is called using an application programming interface (API) call.

As shown, in some embodiments, the adaptive model service 113 includes a model analyzer 751 that analyzes a model 107 to determine its constituent parts (layers, weights, memory usage, etc.) and performance (accuracy, energy usage, etc.). In some embodiments, a user verifies accuracy. In some embodiments, the model analyzer 751 either causes an execution by the edge device of the model 107 to gather performance metrics, or simulates an execution using hardware of the web services provider most like the edge device (for example, using a retrieved data set from a data store).

The result of the analysis of the model 107 is one or more profiles 731. Examples of profiles will be detailed later. Note, in some embodiments, one or more of the model 107, one or more model variants 108, and profile(s) 731 are provided by another entity (such as a user or an adaptive model service 113). The profile(s) 731 highlight 1) model operators; 2) model weights; 3) model data type usage; and 4) model layers.

A model adaptation engine 753 receives edge device characteristics 721 including, for example, FLOPS, GPU RAM, CPU RAM, CPU speed, power, network capabilities (wired, wireless, and their types), memory, etc.; available models; and available model profile(s). In some embodiments, desired objectives of ML execution (such as throughput, power usage, and accuracy) are also received. The model adaptation engine 753 takes the received information and determines how to modify model execution (if needed). For example, if the model 107 can no longer run adequately on an edge device (too many resources are used, for example), the model adaptation engine 753 may provide a profile to the edge device, provide a model variant to the edge device, or cause execution of all, or part, of model based inference at a web services provider.

Figure 8:
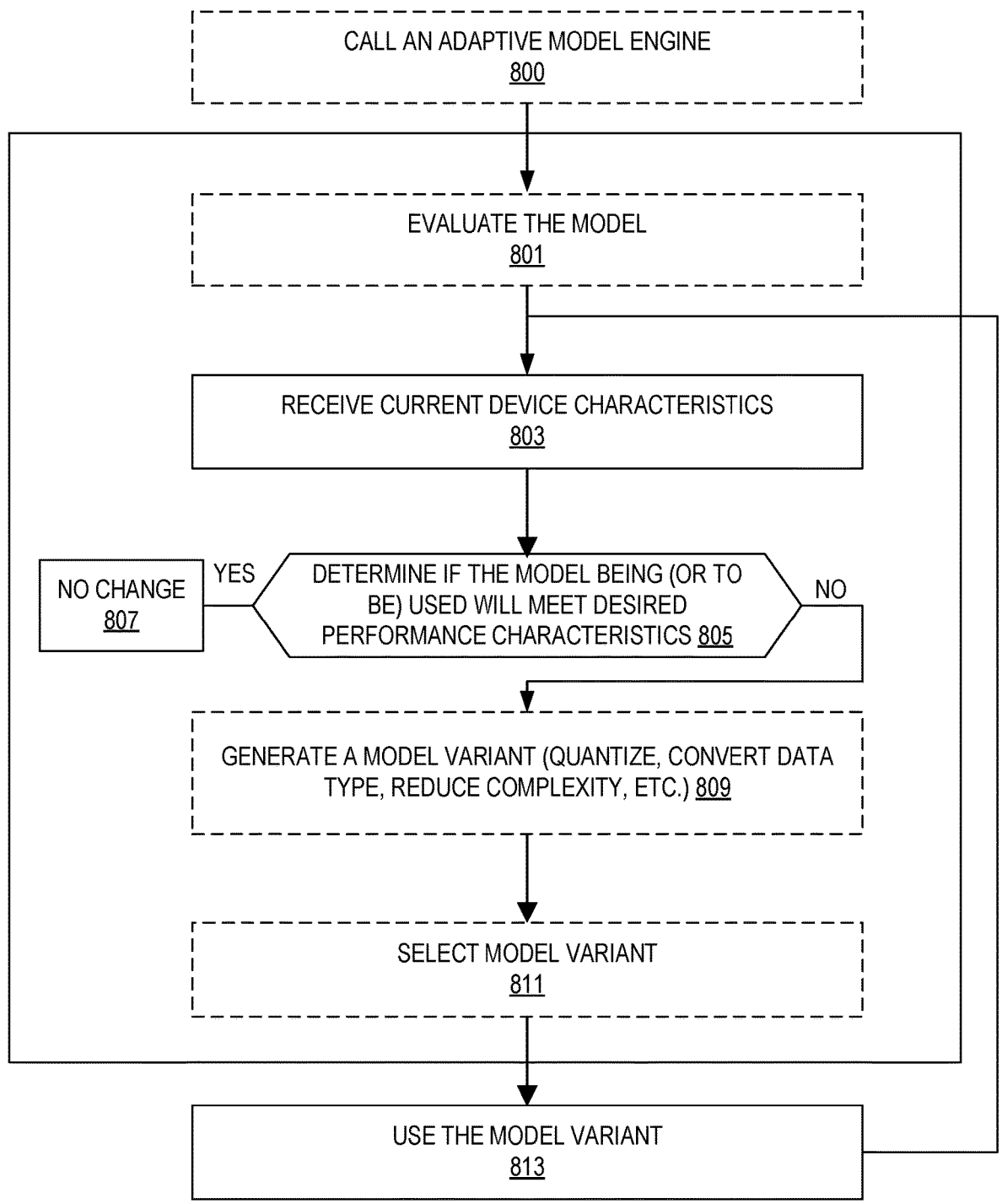
FIG. 8 illustrates embodiments of a method performed by an adaptive model engine.

FIG. 8 illustrates embodiments of a method performed by an adaptive model engine (such as adaptive model engine 109) of an edge device. At 800, the adaptive model engine is called in some embodiments. For example, in some embodiments, when operating parameters of the edge device change, or what is acceptable performance changes, the adaptive model engine is called by software monitoring usage of the model. In other embodiments, a user calls the adaptive model engine. In still other embodiments, the adaptive model engine is always running.

At 801, the adaptive model engine evaluates the model being used. For example, in some embodiments, this evaluation is merely determining what model is being used. In other embodiments, the evaluation of the model includes the generation of a profile as detailed above including determine characteristics (the content of the profile), etc.

Current characteristics of the edge device are received at 803. For example, how much memory is available, what power source is being used (battery or AC), processor types, etc. are received.

A determination of whether the model being (or to be executed) meets desired performance characteristics given the current device characteristics is made at 805. For example, will the model be able to execute within a desired latency, power envelope, accuracy level, or memory footprint? Or, if the model has yet to be used, will it fit within the available memory? In some embodiments, the desired performance characteristics are provided by a user.

If the model will meet desired performance characteristics, then no changes to the model or its execution are made at 807. If the model does not meet desired performance characteristics, in some embodiments a model variant is dynamically generated at 809. For example, some embodiments, a profile of a model variant that will meet the characteristics is selected (one that meets the desired performance characteristics) and used to generate a model variant from the evaluated (or original) model. The model variant may quantize (e.g., change one or more of weights or change data types), change the number of layers, change operator(s) (change to a different operator or fuse operators), unroll the neural network, etc. In some embodiments, a call to an adaptive model service is made which, in turn, provides a profile to use.

In some embodiments, a model variant is generated without using a profile. For example, in some embodiments, an algorithm is applied by the model adaptation engine 453 to generate a model variant. An exemplary quantization aspect of this algorithm is as follows. First, a determination of if the edge device's capability to run certain instructions (such as INT8 instructions). When the edge device can run those instructions, a check of whether the memory available and/or power available are below a threshold is made. When the power and/or memory is below threshold, a quantized model variant is generated using the instruction format of the certain instructions. When the conditions above do not hold, the original model is to be used.

In some embodiments, where a profile is not available, if the model being used does not meet desired performance characteristics a model variant is selected at 811. For example, if multiple models are available, the best one is selected that meets the desired performance characteristics. In some embodiments, the selection of a model to use includes a call to an adaptive model service which provides a model variant or a profile.

At 813, the selected variant model or dynamically generated model variant (e.g., generated using the selected profile or without the use of a profile) is used for inference and, at a later point, current device characteristics are received.

In some embodiments, selected or generated model variants are containerized prior to use.

Figure 9:
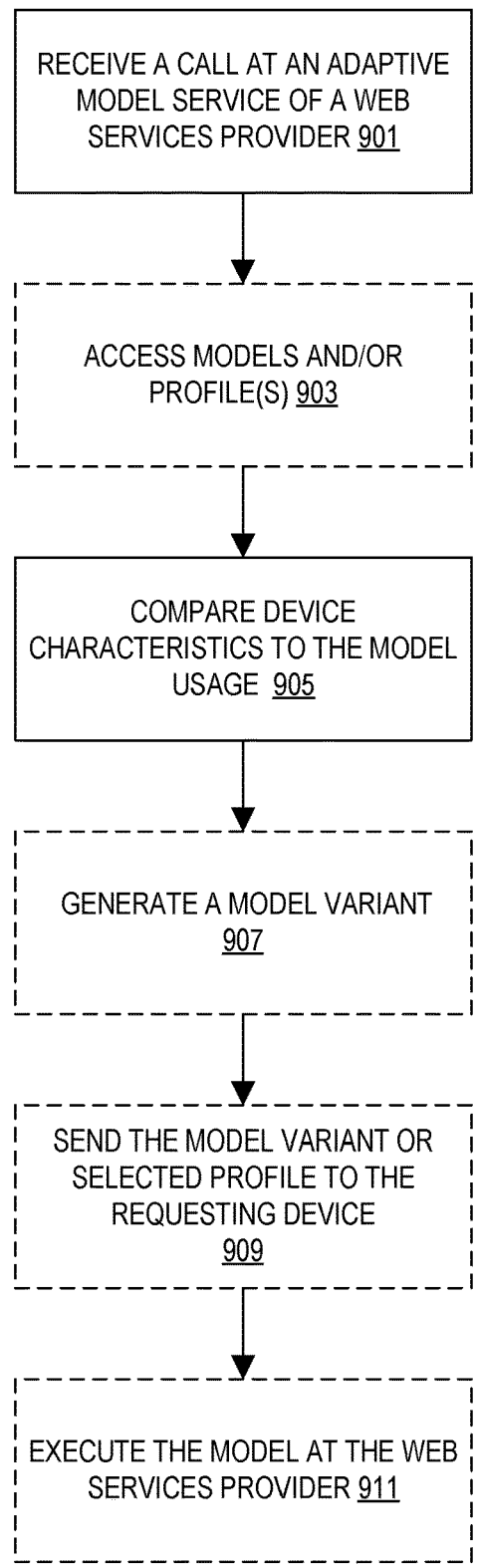
FIG. 9 illustrates embodiments of a method performed by an adaptive model service.

FIG. 9 illustrates embodiments of a method performed by an adaptive model service (such as adaptive model engine 113) of a web services provider. At 901, a call is received at the adaptive model service to determine a model variant or profile to use. For example, an API call from an edge device is received. The API call provides the desired performance of the model, a model identifier (or the model itself), and current device characteristics.

Available model(s) and/or profile(s) are accessed based on the model identifier (or model itself) at 903. For example, model and profile storage 117 is queried for the model (if it was not sent with the call) and related profiles and variants. In some embodiments, each profile has an associated model (or variant) stored. In some embodiments, when no variant model(s) and/or profile(s) are available, they are generated as detailed in FIG. 10.

The received current device characteristics are compared to the accessed profile(s) and model(s) to select a profile or model to use based on the requested performance of the model at 905.

At 907 a model variant is generated. In some embodiments, the selected profile is applied to the model to generate a model variant in some embodiments. In some embodiments, a model variant is generated without using a profile. For example, in some embodiments, an algorithm is applied by the model adaptation engine 753 to generate a model variant. An exemplary quantization aspect of this algorithm is as follows. First, a determination of if the edge device's capability to run certain instructions (such as INT8 instructions). When the edge device can run those instructions, a check of whether the memory available and/or power available are below a threshold is made. When the power and/or memory is below threshold, a quantized model variant is generated using the instruction format of the certain instructions. When the conditions above do not hold, the original model is to be used. In some embodiments, the generated model variant is containerized.

At 909, in some embodiments, the selected model, generated model variant, or selected profiled is sent to the requesting device. In some embodiments, a model that is sent is a part of a container.

In some embodiments, if the desired performance of the model cannot be achieved on the edge device, the model is executed on the web services provider and results provided back to the edge device as needed at 911.

Figure 10:
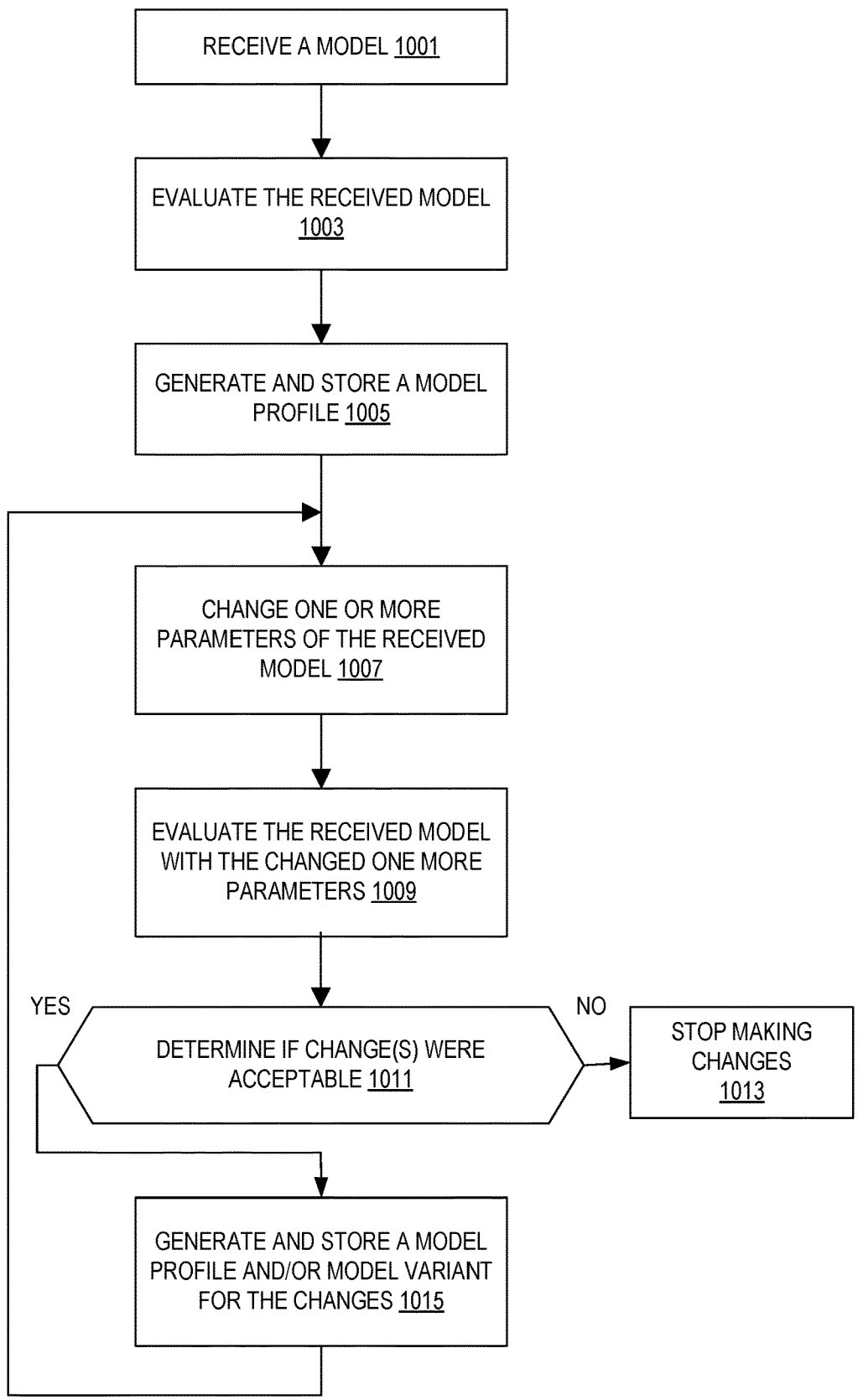
FIG. 10 illustrates embodiments of a method performed by an adaptive model service.

FIG. 10 illustrates embodiments of a method performed by an adaptive model service (such as adaptive model engine 113) of a web services provider. In particular, embodiments of this method involve generating one or more model profiles and/or model variants.

At 1001, a model to evaluate for variants and/or profiles is received. For example, model analyzer 751 receives model 107 from model and profile storage 117, or from a request to generate model profiles and/or model variants.

The received model is evaluated at 1003. The evaluation of the model includes determining how much memory is used (per layer), the amount of energy consumed, and the accuracy of the model. Further, layer specifics such as nodes, data types used, operators, etc. are pulled from the model code. In some embodiments, to determine the amount of energy consumed, the model is caused to be used to determine energy usage on an edge device. For example, an edge device uses the model and tracks energy usage, or the edge device use of the model is simulated and energy usage tracked. In other embodiments, known energy values for particular operators are used to calculate energy usage. In some embodiments, the accuracy of the model is tested using testing data used to train the model.

The information gleaned from the evaluation is used to generate a profile which is stored in model and profile storage 117 and/or sent to an edge device for storage at 1005.

Exemplary profiles have been detailed above.

One or more parameters of the received model are changed at 1007. Changing one or more parameters allows for testing how a model reacts to different variables that may be used in the generation of a model variant. Examples of changed parameters including quantizing (such as going from 32-bit floating point to 8-bit integer), layer pruning, changing or fusing operators, and/or unrolling a neural network.

The received model is evaluated using the changed one or more parameters at 1009. The evaluation of the model using the changes includes determining how much memory is used (per layer), the amount of energy consumed, and the accuracy of the model. Further, layer specifics such as nodes, data types used, operators, etc. are pulled from the model code. In some embodiments, the model is caused to be used to determine energy usage on an edge device. For example, an edge device uses the model and tracks energy usage, or the edge device use of the model is simulated and energy usage tracked. In other embodiments, known energy values for particular operators are used to calculate energy usage. In some embodiments, the accuracy of the model is tested using testing data used to train the model.

A determination of if the changes were acceptable is made at 1011. For example, was the accuracy at an acceptable level? Typically, what is deemed accessible is provided by a user that makes the request to generate profiles and/or model variants. When the changes are not acceptable, no more changes are made and the method stops at 1013.

When the changes are acceptable, the information gleaned from the evaluation is used to generate one or more of a profile and a model variant which is/are stored in model and profile storage 117 and/or sent to an edge device for storage at 1015.

In some embodiments, generated model variants are containerized.

Figure 11:
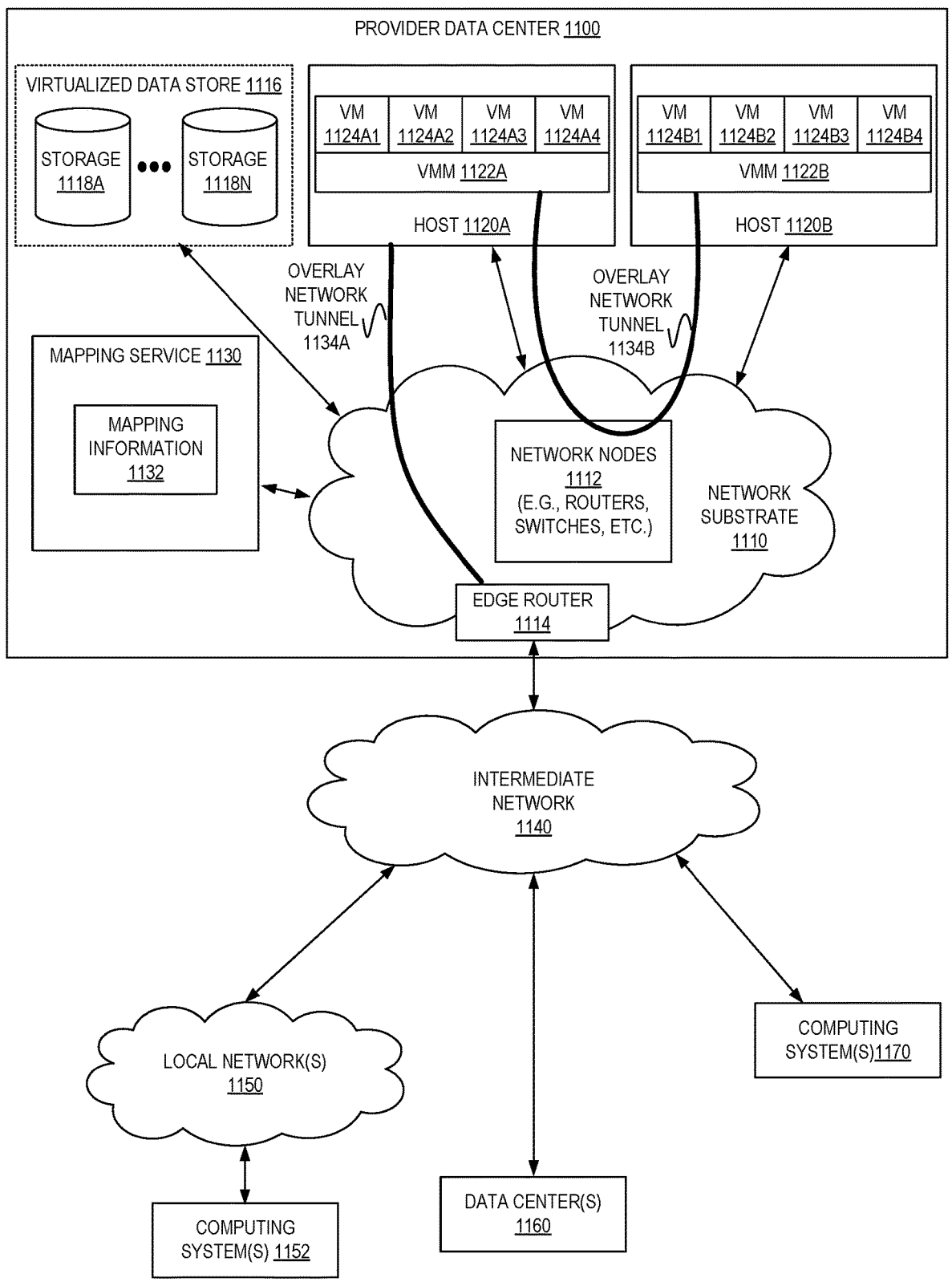
FIG. 11 illustrates an example data center that implements an overlay network on a network substrate using IP tunneling technology according to some embodiments.

FIG. 11 illustrates an example data center that implements an overlay network on a network substrate using IP tunneling technology, according to some embodiments. A provider data center 1100 may include a network substrate that includes networking nodes 1112 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 1110 using tunnels. The IP tunneling technology may provide a mapping and encapsulating system for creating an overlay network on a network (e.g., a local network in data center 1100 of FIG. 11) and may provide a separate namespace for the overlay layer (the public IP addresses) and the network substrate 1110 layer (the local IP addresses). Packets in the overlay layer may be checked against a mapping directory (e.g., provided by mapping service 1130) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 1130) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 11, an example overlay network tunnel 1134A from a virtual machine (VM) 1124A (of VMs 1124A1-1124A4, via VMM 1122A) on host 1120A to a device on the intermediate network 1150 and an example overlay network tunnel 1134B between a VM 1124A (of VMs 1124A1-1124A4, via VMM 1122A) on host 1120A and a VM 1124B (of VMs 1124B1-1124B4, via VMM 1122B) on host 1120B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 11, at least some networks in which embodiments may be implemented may include hardware virtualization technology that enables multiple operating systems to run concurrently on a host computer (e.g., hosts 1120A and 1120B of FIG. 11), i.e. as virtual machines (VMs) 1124 on the hosts 1120. The VMs 1124 may, for example, be executed in slots on the hosts 1120 that are rented or leased to customers of a network provider. A hypervisor, or virtual machine monitor (VMM) 1122, on a host 1120 presents the VMs 1124 on the host with a virtual platform and monitors the execution of the VMs 1124. Each VM 1124 may be provided with one or more local IP addresses; the VMM 1122 on a host 1120 may be aware of the local IP addresses of the VMs 1124 on the host. A mapping service 1130 may be aware of (e.g., via stored mapping information 1132) network IP prefixes and IP addresses of routers or other devices serving IP addresses on the local network. This includes the IP addresses of the VMMs 1122 serving multiple VMs 1124. The mapping service 1130 may be centralized, for example on a server system, or alternatively may be distributed among two or more server systems or other devices on the network. A network may, for example, use the mapping service technology and IP tunneling technology to, for example, route data packets between VMs 1124 on different hosts 1120 within the data center 1100 network; note that an interior gateway protocol (IGP) may be used to exchange routing information within such a local network.

In addition, a network such as the provider data center 1100 network (which is sometimes referred to as an autonomous system (AS)) may use the mapping service technology, IP tunneling technology, and routing service technology to route packets from the VMs 1124 to Internet destinations, and from Internet sources to the VMs 1124. Note that an external gateway protocol (EGP) or border gateway protocol (BGP) is typically used for Internet routing between sources and destinations on the Internet. FIG. 11 shows an example provider data center 1100 implementing a network that provides resource virtualization technology and that provides full Internet access via edge router(s) 1114 that connect to Internet transit providers, according to some embodiments. The provider data center 1100 may, for example, provide customers the ability to implement virtual computing systems (VMs) 1124 via a hardware virtualization service and the ability to implement virtualized data stores 1116 on storage resources 1118A-1118N via a storage virtualization service.

The data center 1100 network may implement IP tunneling technology, mapping service technology, and a routing service technology to route traffic to and from virtualized resources, for example to route packets from the VMs 1124 on hosts 1120 in data center 1100 to Internet destinations, and from Internet sources to the VMs 1124. Internet sources and destinations may, for example, include computing systems 1170 connected to the intermediate network 1140 and computing systems 1152 connected to local networks 1150 that connect to the intermediate network 1140 (e.g., via edge router(s) 1114 that connect the network 1150 to Internet transit providers). The provider data center 1100 network may also route packets between resources in data center 1100, for example from a VM 1124 on a host 1120 in data center 1100 to other VMs 1124 on the same host or on other hosts 1120 in data center 1100.

A service provider that provides data center 1100 may also provide additional data center(s) 1160 that include hardware virtualization technology similar to data center 1100 and that may also be connected to intermediate network 1140. Packets may be forwarded from data center 1100 to other data centers 1160, for example from a VM 1124 on a host 1120 in data center 1100 to another VM on another host in another, similar data center 1160, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 1118A-1118N, as virtualized resources to customers of a network provider in a similar manner.

Figure 12:
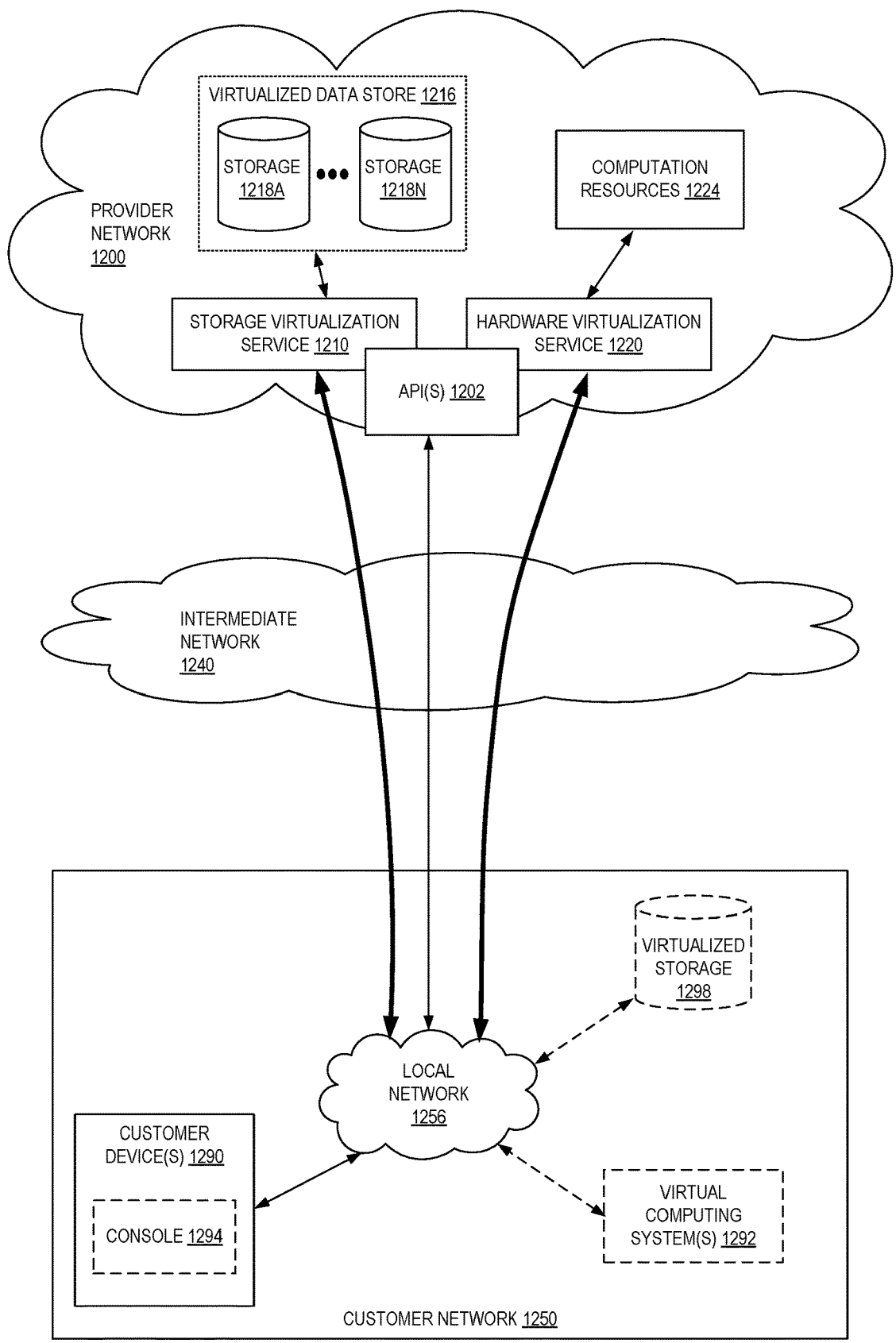
FIG. 12 is a block diagram of an example provider network that provides a storage virtualization service and a hardware virtualization service to customers according to some embodiments.

FIG. 12 is a block diagram of an example provider network that provides a storage virtualization service and a hardware virtualization service to customers, according to some embodiments. Hardware virtualization service 1220 provides multiple computation resources 1224 (e.g., VMs) to customers. The computation resources 1224 may, for example, be rented or leased to customers of the provider network 1200 (e.g., to a customer that implements customer network 1250). Each computation resource 1224 may be provided with one or more local IP addresses. Provider network 1200 may be configured to route packets from the local IP addresses of the computation resources 1224 to public Internet destinations, and from public Internet sources to the local IP addresses of computation resources 1224.

Provider network 1200 may provide a customer network 1250, for example coupled to intermediate network 1240 via local network 1256, the ability to implement virtual computing systems 1292 via hardware virtualization service 1220 coupled to intermediate network 1240 and to provider network 1200. In some embodiments, hardware virtualization service 1220 may provide one or more APIs 1202, for example a web services interface, via which a customer network 1250 may access functionality provided by the hardware virtualization service 1220, for example via a console 1294 (e.g., a web-based application, standalone application, mobile application, etc.). In some embodiments, at the provider network 1200, each virtual computing system 1292 at customer network 1250 may correspond to a computation resource 1224 that is leased, rented, or otherwise provided to customer network 1250.

From an instance of a virtual computing system 1292 and/or another customer device 1290 (e.g., via console 1294), the customer may access the functionality of storage virtualization service 1210, for example via one or more APIs 1202, to access data from and store data to storage resources 1218A-1218N of a virtual data store 1216 provided by the provider network 1200. In some embodiments, a virtualized data store gateway (not shown) may be provided at the customer network 1250 that may locally cache at least some data, for example frequently accessed or critical data, and that may communicate with virtualized data store service 1210 via one or more communications channels to upload new or modified data from a local cache so that the primary store of data (virtualized data store 1216) is maintained. In some embodiments, a user, via a virtual computing system 1292 and/or on another customer device 1290, may mount and access virtual data store 1216 volumes, which appear to the user as local virtualized storage 1298.

While not shown in FIG. 12, the virtualization service(s) may also be accessed from resource instances within the provider network 1200 via API(s) 1202. For example, a customer, appliance service provider, or other entity may access a virtualization service from within a respective virtual network on the provider network 1200 via an API 1202 to request allocation of one or more resource instances within the virtual network or within another virtual network.

Illustrative System

Figure 13:
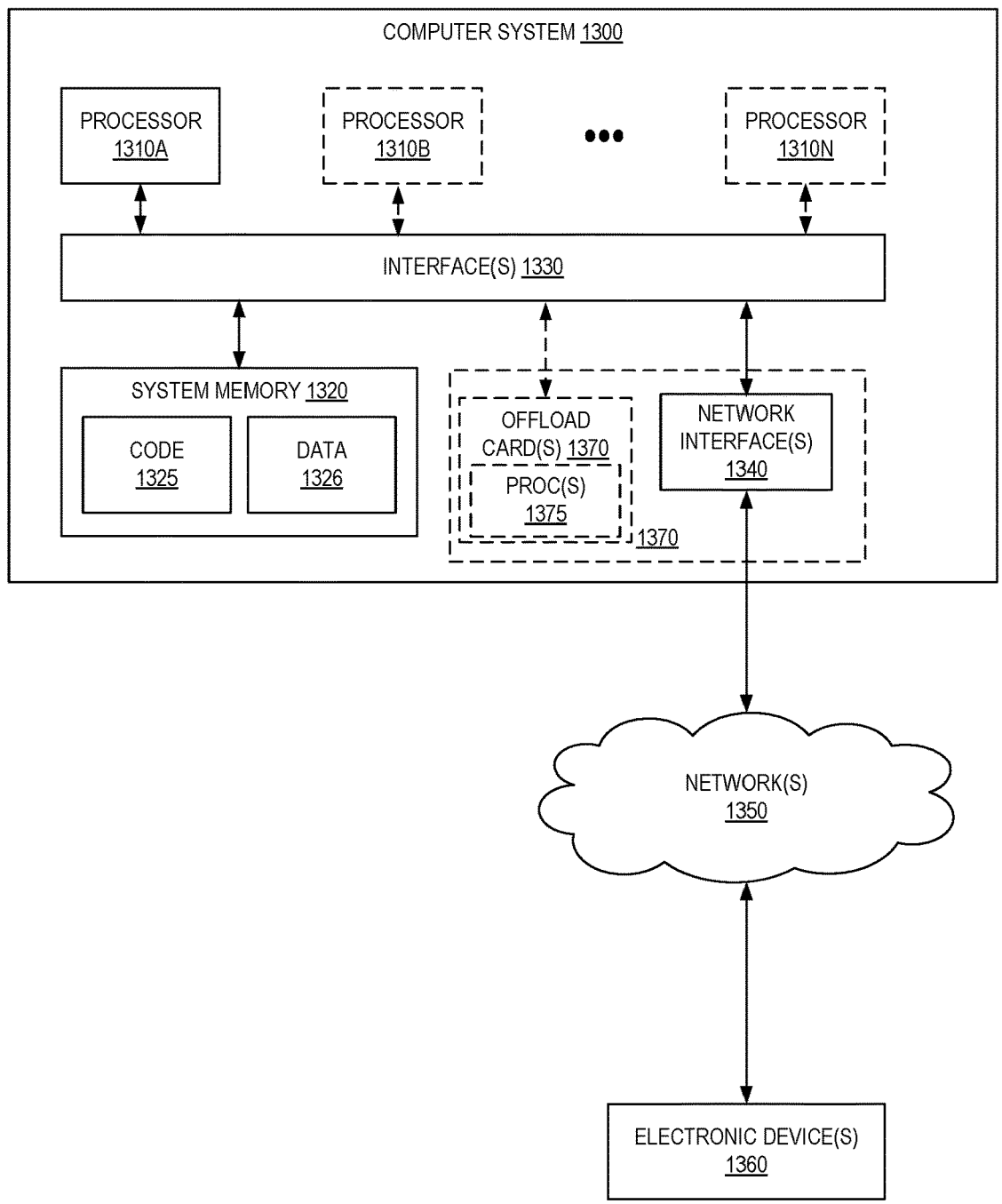
FIG. 13 is a block diagram illustrating an example computer system that may be used in some embodiments.

In some embodiments, a system that implements a portion or all of the techniques for model adaptation as described herein may include a general-purpose computer system that includes or is configured to access one or more computer-accessible media, such as computer system 1300 illustrated in FIG. 13. In the illustrated embodiment, computer system 1300 includes one or more processors 1310 coupled to a system memory 1320 via an input/output (I/O) interface 1330. Computer system 1300 further includes a network interface 1340 coupled to I/O interface 1330. While FIG. 13 shows computer system 1300 as a single computing device, in various embodiments a computer system 1300 may include one computing device or any number of computing devices configured to work together as a single computer system 1300.

In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1310 may commonly, but not necessarily, implement the same ISA.

System memory 1320 may store instructions and data accessible by processor(s) 1310. In various embodiments, system memory 1320 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1320 as code 1325 and data 1326.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices 1360 attached to a network or networks 1350, such as other computer systems or devices as illustrated in FIG. 1, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1300 includes one or more offload cards 1370 (including one or more processors 1375, and possibly including the one or more network interfaces 1340) that are connected using an I/O interface 1330 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1300 may act as a host electronic device (e.g., operating as part of a hardware virtualization service) that hosts compute instances, and the one or more offload cards 1370 execute a virtualization manager that can manage compute instances that execute on the host electronic device. As an example, in some embodiments the offload card(s) 1370 can perform compute instance management operations such as pausing and/or un-pausing compute instances, launching and/or terminating compute instances, performing memory transfer/copying operations, etc. These management operations may, in some embodiments, be performed by the offload card(s) 1370 in coordination with a hypervisor (e.g., upon a request from a hypervisor) that is executed by the other processors 1310A-1310N of the computer system 1300. However, in some embodiments the virtualization manager implemented by the offload card(s) 1370 can accommodate requests from other entities (e.g., from compute instances themselves), and may not coordinate with (or service) any separate hypervisor.

In some embodiments, system memory 1320 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1300 via I/O interface 1330. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340.

Figure 14:
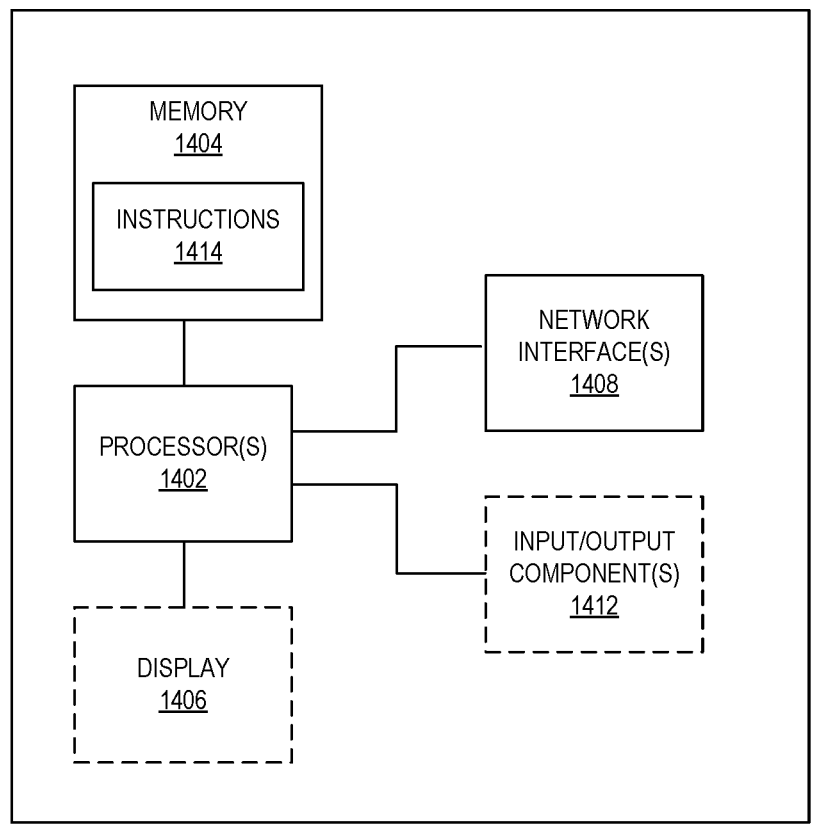
FIG. 14 illustrates a logical arrangement of a set of general components of an exemplary computing device that can be utilized in accordance with various embodiments.

FIG. 14 illustrates a logical arrangement of a set of general components of an example computing device 1400 such as the edge device, web services provider, etc. detailed above. Generally, a computing device 1400 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1402 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1404) to store code (e.g., instructions 1414) and/or data, and a set of one or more wired or wireless network interfaces 1408 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1404) of a given electronic device typically stores code (e.g., instructions 1414) for execution on the set of one or more processors 1402 of that electronic device. One or more parts of various embodiments may be implemented using different combinations of software, firmware, and/or hardware.

A computing device 1400 can include some type of display element 1406, such as a touch screen or liquid crystal display (LCD), although many devices such as portable media players might convey information via other means, such as through audio speakers, and other types of devices such as server end stations may not have a display element 1406 at all. As discussed, some computing devices used in some embodiments include at least one input and/or output component(s) 1412 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 15:
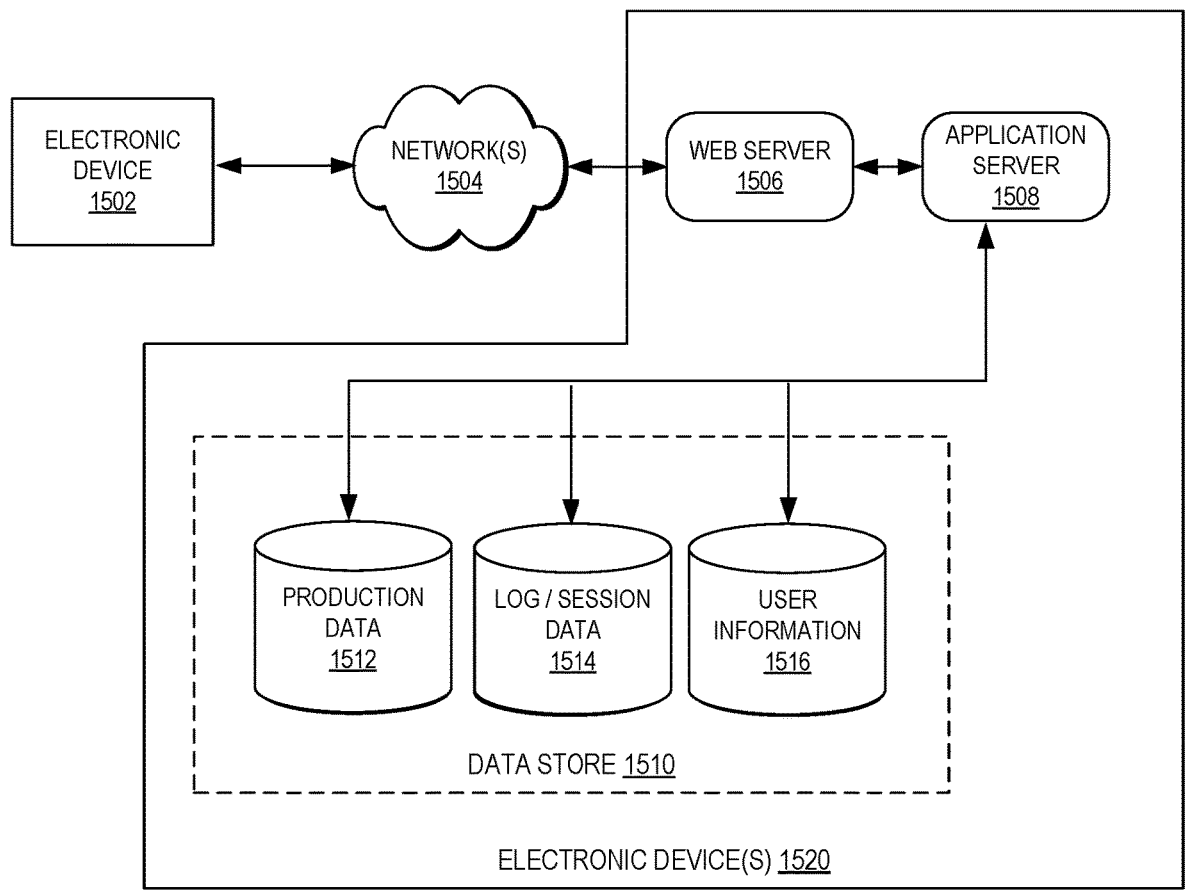
FIG. 15 illustrates an example of an environment for implementing aspects in accordance with various embodiments.

As discussed, different approaches can be implemented in various environments in accordance with the described embodiments. For example, FIG. 15 illustrates an example of an environment 1500 for implementing aspects in accordance with various embodiments. For example, in some embodiments API calls are HyperText Transfer Protocol (HTTP) requests that are received by a web server (e.g., web server 1506), and the users, via electronic devices, may interact with the provider network via a web portal provided via the web server 1506 and application server 1508. As will be appreciated, although a web-based environment is used for purposes of explanation, different environments may be used, as appropriate, to implement various embodiments. The system includes an electronic client device 1502, which may also be referred to as a client device and can be any appropriate device operable to send and receive requests, messages or information over an appropriate network 1504 and convey information back to a user of the device 1502. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1504 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1504 includes the Internet, as the environment includes a web server 1506 for receiving requests and serving content in response thereto, although for other networks an alternative device serving a similar purpose could be used, as would be apparent to one of ordinary skill in the art.

The illustrative environment includes at least one application server 1508 and a data store 1510. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1508 can include any appropriate hardware and software for integrating with the data store 1510 as needed to execute aspects of one or more applications for the client device 1502 and handling a majority of the data access and business logic for an application. The application server 1508 provides access control services in cooperation with the data store 1510 and is able to generate content such as text, graphics, audio, video, etc., to be transferred to the client device 1502, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1502 and the application server 1508, can be handled by the web server 1506. It should be understood that the web server 1506 and application server 1508 are not required and are merely example components, as structured code discussed herein can be executed on any appropriate device or host machine as discussed elsewhere herein.

The data store 1510 can include several separate data tables, databases, or other data storage mechanisms and media for storing data relating to a particular aspect. For example, the data store illustrated includes mechanisms for storing production data 1512 and user information 1516, which can be used to serve content for the production side. The data store 1510 also is shown to include a mechanism for storing log or session data 1514. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update, or otherwise process data in response thereto. In one example, a user might submit a search request for a certain type of item. In this case, the data store 1510 might access the user information 1516 to verify the identity of the user and can access a production data 1512 to obtain information about items of that type. The information can then be returned to the user, such as in a listing of results on a web page that the user is able to view via a browser on the user device 1502. Information for a particular item of interest can be viewed in a dedicated page or window of the browser.

The web server 1506, application server 1508, and/or data store 1510 may be implemented by one or more electronic devices 1520, which can also be referred to as electronic server devices or server end stations, and may or may not be located in different geographic locations. Each of the one or more electronic devices 1520 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the environment 1500 in FIG. 15 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   evaluating, by an adaptive model service of a web services server, a deep learning model to determine characteristics of the deep learning model to be executed on an edge device;
   receiving, by the adaptive model service, device characteristics of the edge device;
   determining, by the adaptive model service, the deep learning model cannot execute on the edge device within at least two of a latency, power envelope, accuracy level, or memory footprint, wherein the determining comprises:
      causing execution of the deep learning model by the edge device and gathering performance metrics; or
      simulating execution of the deep learning model using hardware of the web services server;
   generating, by a model adaptation engine of the adaptive model service, a model variant of the deep learning model, the model variant including, with respect to the deep learning model, at least two of quantization of weights of the deep learning model, removal of one or more layers or removal of nodes of the one or more layers of the deep learning model, or changes to one or more operators of the one or more layers of the deep learning model, wherein the generating comprises:
      generating the model variant based on a model variant profile such that the model variant can execute on the edge device within the at least two of latency, power envelope, accuracy level, or memory footprint; or
      generating the model variant based on an algorithm that determines the edge device capability to run predetermined instructions; and
   sending, by the adaptive model service, the model variant to the edge device to be used to perform inference on the edge device.

2. The computer-implemented method of claim 1, wherein the performance metrics include energy usage on the edge device.

3. The computer-implemented method of claim 1, further comprising containerizing the model variant prior to sending the model variant to the edge device.

4. A computer-implemented method comprising:
   receiving, by an adaptive model service of a web services server, a call to provide a deep learning model, the call including at least two of a latency, power envelope, accuracy level, or memory footprint of the deep learning model, a deep learning model identifier, and current edge device characteristics of an edge device;
   determining, by the adaptive model service, the deep learning model cannot execute within the at least two of latency, power envelope, accuracy level, or memory footprint, wherein the determining comprises:
      causing execution of the deep learning model by the edge device and gathering performance metrics; or
      simulating execution of the deep learning model using hardware of the web services server;
   comparing, by the adaptive model service, the current edge device characteristics to available model variants based on the at least two of latency, power envelope, accuracy level, or memory footprint;
   generating a model variant of the deep learning model, model variant including, with respect to the deep learning model, at least two of quantization of weights of the deep learning model, removal of one or more layers or removal of nodes of the one or more layers of the deep learning model, or changes to one or more operators of the one or more layers of the deep learning model, wherein the generating comprises:
      generating the model variant based on a model variant profile such that the model variant can execute on the edge device within the at least two of latency, power envelope, accuracy level, or memory footprint; or generating the model variant based on an algorithm that determines the edge device capability to run predetermined instructions; and sending, by the adaptive model service, the model variant to the edge device to be used in inference on the edge device.

5. The computer-implemented method of claim 4, wherein the performance metrics include energy usage on the edge device.

6. The computer-implemented method of claim 4, wherein the model variant is sent to the edge device as a part of a container.

7. The computer-implemented method of claim 4, wherein the current edge device characteristics include at least one of available memory, processor capabilities, available power, or network capabilities.

8. The computer-implemented method of claim 4, further comprising applying the selected model variant profile to the deep learning model to generate the model variant.

9. The computer-implemented method of claim 4, further comprising analyzing the deep learning model to determine constituent parts of the deep learning model and a performance of the deep learning model.

10. The computer-implemented method of claim 9, wherein the constituent parts of the deep learning model includes at least one of layers, weights, or memory usage, and the performance of the deep learning model includes at least one of accuracy, energy usage, latency, or memory footprint.

11. The computer-implemented method of claim 4, further comprising:
changing one or more parameters of the deep learning model to yield a changed one or more parameters;
evaluating the deep learning model using the changed one or more parameters to yield an evaluation result; and
generating the model variant profile based on the evaluation result.

12. The computer-implemented method of claim 4, further comprising:
changing one or more parameters of the deep learning model to yield a changed one or more parameters;
evaluating the deep learning model using the changed one or more parameters to yield an evaluation result; and
generating the model variant based on the evaluation result.

13. A system comprising:
an edge device comprising one or more processor(s) and memory storing instructions that, when executed by the processor(s) cause the edge device to send a request for a model variant for a deep learning model to be used for inference on the edge device, the request including at least two of a latency, power envelope, accuracy level, or memory footprint of the deep learning model, a deep learning model identifier, and current edge device characteristics; and
a web services server comprising one or more processor(s) and memory storing instructions that, when executed by the processor(s) cause the web services server to receive the request for a model variant, and in response to the request:
determine the deep learning model cannot execute within the at least two of latency, power envelope, accuracy level, or memory footprint by:
causing execution of the deep learning model by the edge device and gathering performance metrics; or
simulating execution of the deep learning model using hardware of the web services server;
compare the current edge device characteristics to available model variants based on the at least two of latency, power envelope, accuracy level, or memory footprint; and
generate a model variant of the deep learning model, the model variant including, with respect to the deep learning model, at least two of quantization of weights of the deep learning model, removal of one or more layers or removal of nodes of the one or more layers of the deep learning model, or changes to one or more operators of the one or more layers of the deep learning model, wherein the generating comprises:
generating the model variant based on a model variant profile such that the model variant can execute on the edge device within the at least two of latency, power envelope, accuracy level, or memory footprint; or
generating the model variant based on an algorithm that determines the edge device capability to run predetermined instructions; and
send the model variant to the edge device to use in the inference.

14. The system of claim 13, wherein the current edge device characteristics include at least one of available memory, processor capabilities, available power, or network capabilities.

15. The system of claim 13, wherein the memory of the web services server stores further instructions that, when executed by the processor(s) of the web services server, further cause the web services server to apply the model variant profile to the deep learning model to generate the model variant.

16. The system of claim 13, wherein the model variant is sent to the edge device as a part of a container.

17. The system of claim 13, wherein the memory of the web services server stores further instructions that, when executed by the processor(s) of the web services server further cause the web services server to apply the model variant profile to the deep learning model to generate the model variant.

18. The system of claim 13, wherein the memory of the web services server stores further instructions that, when executed by the processor(s) of the web services server further cause the web services server to analyze the deep learning model to determine constituent parts of the deep learning model and a performance of the deep learning model.

* * * * *